UNITED STATES PATENT OFFICE.

OTTO N. WITT, OF MULHOUSE, ASSIGNOR TO LEOPOLD CASSELLA & CO., OF FRANKFORT, GERMANY.

PRODUCTION OF COLORING-MATTER.

SPECIFICATION forming part of Letters Patent No. 249,136, dated November 1, 1881.

Application filed August 24, 1881. (Specimens.)

*To all whom it may concern:*

Be it known that I, OTTO NICHOLAS WITT, Ph. D., of Mulhouse, Germany, and a subject of the Emperor of Germany, have invented a new and useful Improvement in the Production of Coloring-Matters, of which the following is a specification.

The object of the invention is to furnish a coloring-matter which, being of a deep-red shade, is at the same time faster, cheaper, and easier of application than the substances hitherto used for the same purpose. My new dye also readily combines with most other artificial dyes, giving rise to a great variety of shades.

To produce this new coloring-matter I proceed as follows: I place in a wooden vat one hundred and eighty-six pounds of nitroso-dimethylaniline hydrochloride. I then add a solution of one hundred and twenty-two pounds of metatoluylenediamine in two hundred and sixteen gallons of water. I take care to obtain a perfect solution by vigorous stirring, and when this is the case I allow the liquid to remain undisturbed during several hours. I then introduce a steam-jet and gradually raise the temperature of the liquid to the boiling-point. I now introduce gradually one hundred and sixteen pounds of ordinary aqueous hydrochloric acid, or a corresponding quantity of any other acid. I may—but this is not absolutely necessary—facilitate and quicken the reaction by the injection of cold or hot air, or by adding an oxidizing agent, such as—for instance, ferric chloride. When the color of the solution ceases to increase in intensity I allow the liquid to cool, and then precipitate the dyestuff which it now contains by the addition of a salt, such as sodic chloride or acetate, zincic chloride, or even by soda. In the latter case the precipitate, after filtering, and before drying it, must be mixed with so much hydrochloric acid as is necessary to allow, after drying, of a ready solution in hot water. The exact quantity of acid necessary for this purpose must be ascertained each time by a previous test.

Instead of working in an aqueous solution, I may induce the reaction of the above-named reagents by mere fusion, with or without the addition of oxidizing reagents, such as ferric chloride, potassic bichromate, or any other; nor do I limit myself to the exact proportions and solvents indicated, as they may be varied without departing from the principle of my invention.

The dye thus obtained gives dark-red shades on cotton, wool, and silk, and these shades may be varied by the admixture of other artificial dyes.

What I claim as new is—

A dark-red dye formed by the action of nitroso-dimethylaniline on metatoluylenediamine.

In testimony whereof I have signed my name to this specification in the presence of two subscribing witnesses.

OTTO N. WITT, PH. D.

Witnesses:
EMMANUEL DE LAHR-MAYENFELD,
CHS. DE LA HARPE, *Lecturer*,
Both of *Mulhouse, Germany.*